UNITED STATES PATENT OFFICE.

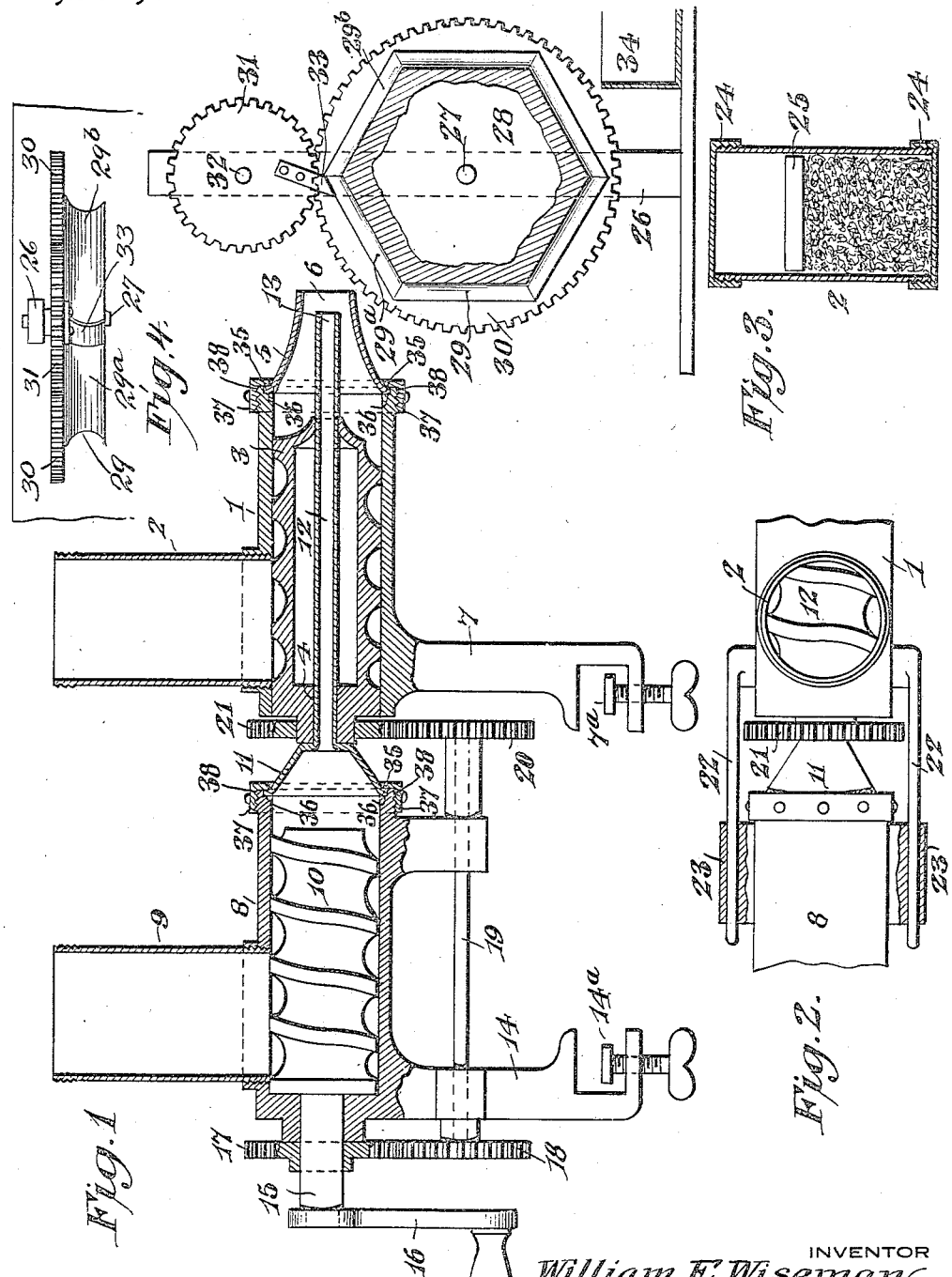

WILLIAM E. WISEMAN, OF PALACIOS, TEXAS.

MACHINE FOR MAKING LUNCH-ROLLS.

1,265,853.  Specification of Letters Patent.  Patented May 14, 1918.

Application filed May 18, 1917. Serial No. 169,466.

*To all whom it may concern:*

Be it known that I, WILLIAM E. WISEMAN, a citizen of the United States, residing at Palacios, in the county of Matagorda and State of Texas, have invented a new and useful Machine for Making Lunch-Rolls, of which the following is a specification.

This invention relates to machines for making Hamburger rolls, similar to the Mexican hot tamala, well known all over Texas.

An object of the invention is to provide a construction by which a food of one kind may be rolled or jacketed or incased about a food of another kind, as for instance, ground meat such as Hamburger is inclosed by a surrounding dough of flour or corn meal, forming a roll. While specifically designed for this purpose, it can also be used to combine fruit and bread.

Another object of the invention is to provide a construction in which a lunch roll may be quickly prepared without touching the same with the hand, and which will be especially adapted for use by street venders, short order restaurants, carnivals, or at any gatherings where a quick, hot lunch is wanted.

Another object of the invention is to provide in connection with a construction of the above nature, a device which will cut the roll as it issues from the machine into sections of definite lengths, and which allows the sections to fall into a cooker or pan of hot grease, the cutting device being operated by the force of the issuing roll.

In the accompanying drawings, I have illustrated one embodiment of my invention, in which:

Figure 1 is a longitudinal sectional view through the machine.

Fig. 2 is a fragmentary plan view partly in section of the same.

Fig. 3 is a sectional view through one of the hopper receptacles.

Fig. 4 is a plan view of the member and knife.

In the form here illustrated, a cylinder 1 is provided with a detachable hopper 2 for the reception of a suitable food material such as dough made from flour or corn meal, while rotatably supported within the cylinder is a feeding screw 3 provided with a longitudinal central bore 4 therethrough. Fixed to one end of the cylinder is a funnel 5 terminating at the reduced outer end thereof in an opening or contracted outlet 6 through which the dough is forced by the screw. The cylinder 1 is provided with a depending bracket 7 having a suitable clamp 7ª whereby it may be clamped to a table or elsewhere.

Mounted in alinement with the cylinder 1, at the end thereof remote from the funnel 5, is a second cylinder 8 likewise provided with a detachable hopper 9 communicating therewith and adapted to receive a food material of different kind, such as Hamburger or other ground meat. A feeding screw 10 is rotatably supported and journaled within the cylinder. Fixed to the end of the cylinder 8 adjacent to the cylinder 1 is a funnel 11, which terminates at its reduced end in an elongated tube 12 through which the Hamburger or other material is forced by the screw 10, and which extends through the bore or opening 4 of the feeding screw 3 toward the funnel 5 and terminates at its free end in the funnel 5 slightly inwardly from the orifice 6 thereof. This tube acts as a core former and serves to give a definite shape to the meat or fruit (as the case may be) while the funnel 5 compresses the dough or bread about the meat or fruit. The cylinder 8 is likewise provided with a depending bracket 14 having a suitable clamp 14ª, whereby it may be clamped in position to a table or elsewhere.

The feeding screw 10 is provided at the end thereof remote from the funnel 11 with a stud or shaft 15 to which is attached a suitable actuating handle or crank 16. A gear 17 is fixed to the stud or shaft 15, and meshes with a gear 18 fixed to one end of a shaft 19, journaled in the bracket 14 and extending longitudinally of the cylinder 8. The opposite end of the shaft 19 has fixed to it a gear 20 which meshes with a gear 21 fixed to the feeding screw 3, whereby the screws will be rotated in the same direction at the same speed and force the food materials toward the orifice 6.

In order to retain the cylinders 1 and 8 in alinement with each other and rigidly fixed together to prevent the disarrangement of the tube 12, one of them is provided with opposite arms 22, see Fig. 2, which interlock with or engage suitable grooves or apertured lugs 23 upon the opposite cylinder.

Preferably, the hoppers 2 and 9 are adapted to carry the material which is to be mixed or treated and serve as receptacles for holding the same. For this purpose each of them is threaded, see Fig. 3, at the open ends and provided with caps 24. When it is desired to use the contents of one of the hoppers, one of the caps is removed and the open end of the hopper is attached to the cylinder. In order to cause a feed from the hoppers into the cylinders 1 and 8, suitable weights 25 are provided, as shown in Fig. 3, which may be placed in position in the hoppers by removing the outer caps.

Mounted in front of the orifice 6 is a bracket or frame 26 to which is journaled, as at 27, a polygonal member 28, the edges of which are provided with grooves 29. The member 28 is located slightly in front of and below the orifice 6, whereby the roll of material as it issues from, or is forced through the orifice 6, will engage the member and rest in the groove 29$^a$, causing the rotation of the member. Fixed to the member 28 is a gear 30 which meshes with a gear 31 journaled at 32 to the frame 26. The gear 31, in the present instance, is arranged to make six revolutions to one revolution of the gear 30 and member 28, which as here shown is hexagonal. Fixed to the gear 31 is a knife 33 which will engage the member 28 six times during each revolution thereof, or once at every edge thereof, whereby the food as it issues from the orifice 6 will be cut into sections of definite length. The knife 33 is of a width and shape to correspond to the cross-section of the groove. The impact or engagement of the issuing roll with the groove 29$^a$ of the member 28 will cause the rotation thereof at one side, while the weight of the severed piece resting upon the groove 29$^b$ at the opposite side of the knife, will also assist in rotating the member 28 clockwise, so that the severed pieces will drop within the pan 34. The pan 34 may have suitable cooking fluid therein, such as hot grease, in order to properly heat or cook the mixed material or food.

By arranging the feeding screws in alinement a very efficient action is obtained and the material is more thoroughly mixed and forced along. The hopper 9 at the left, as shown in Fig. 1, is adapted to receive cooked meat which has been ground and seasoned, while the hopper 2 at the right, looking at Fig. 1, will receive the dough or bread. The handle 16 is then rotated, which will cause a rotation of the feeding screws in the same direction and forcibly feed the material toward the right, looking at Fig. 1. The meat will be fed through the elongated tube 12, while the dough will form a jacket or casing and be compressed around the meat as it issues from the tube in the funnel 5. After the ground meat has been jacketed by the dough, the roll may be browned and served in grease, as above described.

The funnel 5 and the funnel 11 with its cylindrical tube 12 are detachable from their respective cylinders in order that the interior of the cylinders may be cleaned when desired. For this purpose, the inner end of each funnel is provided with a flange 35 fitting in a recess 36 upon the adjacent end of the cylinder. An annular clamping member 37 encircles the funnel and is adapted to clamp the same in position, the annular clamping member having a threaded engagement with the end of the cylinder, as shown at 38.

While I have shown and described one embodiment of my invention, it is to be understood that I do not desire to be limited to the details of construction herein shown and described, for obvious modifications will be apparent to anyone skilled in the art.

What is claimed is:—

1. In a machine of the character described, a cylinder having a funnel end provided with a contracted outlet, a feed screw within the cylinder and having a longitudinal central bore, a second funnel exteriorly of the cylinder and abutting the feed screw at its end remote from the first funnel, a tube having a smooth outer surface extending from the second funnel through the bore in the feed screw and terminating at a point inwardly from the reduced end of the first funnel to provide a core former, means for feeding material through the tube, said means being located in rear of the second funnel, and means for rotating the feed screw.

2. The combination with a pair of cylinders, individual clamps for securing said cylinders to a support, of feed screws rotatably mounted within said cylinders, one of the feed screws being formed with a central longitudinal bore, a funnel on one end of each cylinder, a tube extending from the funnel of one cylinder entirely through said bore in proximity to the other funnel with the discharge end of the tube spaced inwardly from the discharge end of the last-named funnel, exteriorly located means connecting the cylinders to retain them in longitudinal alinement and fixed relation, and means for actuating the feed screws simultaneously with each other.

3. The combination with a pair of cylinders, individual clamps for securing said cylinders to a support, feed screws rotatably mounted within said cylinders, one of the feed screws being formed with a central longitudinal bore, a funnel on one end of each cylinder, a tube extending from the funnel of one cylinder entirely through said bore in proximity to the other funnel with the free end of the tube spaced inwardly from the discharge end of the last-named funnel, arms on one cylinder engaging lugs on the other cylinder for retaining the cylinders in longitudinal alinement and fixed relation, and means for feeding material into the cylinders at their ends remote from the funnels.

4. In a machine of the character described, a cylinder provided at one end with a funnel having a contracted outlet and at the other end having a hopper, a feed screw therein for feeding material toward said funnel from the hopper, said feed screw being provided with a longitudinal central bore throughout, a second cylinder independent of the first cylinder and arranged in tandem therewith and provided at the end adjacent the first-mentioned cylinder with a funnel, and a tube leading from the funnel extending longitudinally through the bore of the feed screw of the first-mentioned cylinder and terminating within the funnel thereof inwardly from the outlet of said funnel, a second feed screw mounted in the second cylinder and terminating short of the funnel to feed the material from the hopper to and through the funnel and tube, an operating crank for operating the second feed screw, and connecting gearing between the crank and the first-mentioned feed screw whereby said feed screws are operated simultaneously and at the same rate of speed.

5. In combination with a machine having a discharge outlet through which food is forcibly fed therefrom, a frame, a polygonal drum rotatably mounted in said frame below and slightly in advance of the discharge outlet and having its periphery grooved to receive the food discharged by the machine, whereby said polygonal drum will be rotated by the impact of the food issuing from the machine and a cutter operative in the groove to sever the material in predetermined lengths.

6. In combination with a machine having a discharge outlet through which food is forcibly fed therefrom, a frame, a polygonal drum rotatably mounted in said frame below and in advance of the discharge outlet and having its periphery grooved to receive the food discharged by the machine, whereby said polygonal drum will be rotated by the impact of the food issuing from the machine, and a knife operative in the groove and movable in synchronism with said drum for the purpose of cutting the food into definite lengths.

7. In combination with a machine having a discharge outlet through which material is forcibly fed, of a frame, a drum rotatably mounted on said frame and having a polygonal grooved periphery, said frame being mounted below and slightly in advance of the discharge outlet of said machine whereby the force of the food will rotate said drum, and a cutter actuated by the movement of said drum and working within the groove to cut the food into definite lengths as it is received in the grooved periphery.

8. The combination with a machine having a discharge outlet for feeding food therefrom, of a frame, a drum rotatably mounted on said frame having a polygonal grooved periphery and mounted below and in front of the discharge outlet of said machine, whereby the force of the food issuing from the machine will rotate the drum, a gear fixed to said drum, a second gear rotatably mounted above said drum and meshing with said first-mentioned gear, and a knife carried by said second gear, and adapted to be rotated therewith to cut the food into definite lengths.

In testimony, that I claim the foregoing as my own, I have hereto affixed my signature in the presence of two witnesses.

WILLIAM E. WISEMAN.

Witnesses:
C. B. HANSEN,
L. P. DAVIS.